(No Model.)
C. F. PIKE.
ORE WASHER AND SEPARATOR.
No. 566,534. Patented Aug. 25, 1896.
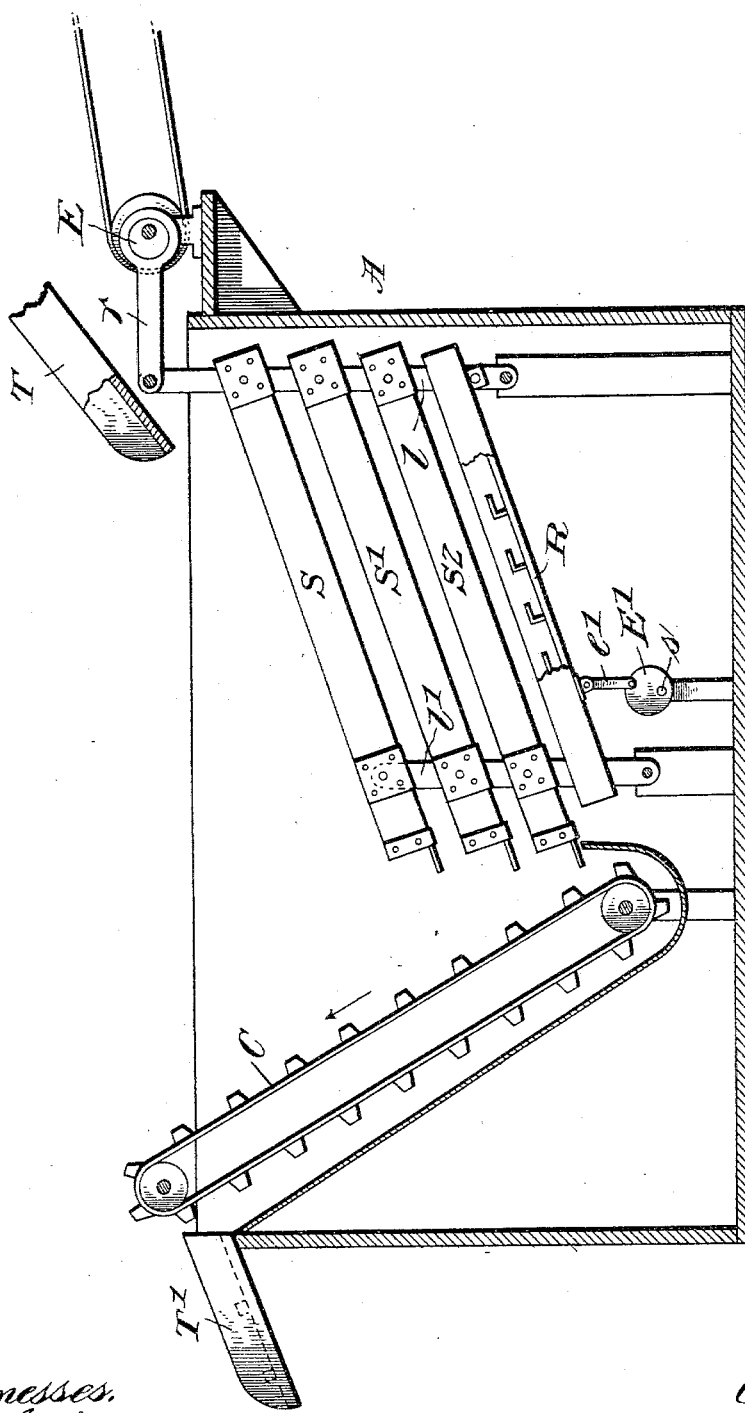

UNITED STATES PATENT OFFICE.

CHARLES F. PIKE, OF PHILADELPHIA, PENNSYLVANIA.

ORE WASHER AND SEPARATOR.

SPECIFICATION forming part of Letters Patent No. 566,534, dated August 25, 1896.

Application filed March 4, 1895. Serial No. 540,402. (No model.)

*To all whom it may concern:*

Be it known that I, CHARLES F. PIKE, a citizen of the United States, residing in Philadelphia, Pennsylvania, have invented certain new and useful Improvements in Ore Washers and Separators; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

My invention has relation to ore washers and separators or concentrators, and more particularly to that class of apparatus or machines adapted to the working of placer-gravel.

It has long been known that placer-gravel cannot be profitably worked except by a rapid treatment of large quantities of the material, while it is essential that said material should be thoroughly washed.

In rapidly treating large quantities of placer-gravel the black sand contained therein accumulates very rapidly and fills and packs in the riffles, which then become inoperative, the metal passing off the riffled plate with the successive accumulations as soon as the riffles are packed with such sand. This difficulty I have effectually overcome, and am enabled to thoroughly wash the ore, by immersing the screen or screens, as well as the riffled plate beneath the same, in a body of confined water, in contradistinction to the use of running water, and by imparting to said screen or screens and riffled plate a reciprocating or jigging motion in the direction of their length, whereby the material on the screens and riffled plate receive successive short forward movements, thereby scattering said material and keeping the same alive in the body of water, enabling the particles of metal to freely separate from the gravel and black sand and subside, said particles of metal passing with the black sand from the screens to the riffled plate, where the metal is concentrated by the riffles, as fully described in Letters Patent of the United States granted to me under date of November 13, 1894, No. 529,307.

Although the results obtained by the method of treatment referred to could not be obtained by any of the older methods, in that I have been enabled to separate and recover such of the finer or lighter particles of metal which could not be recovered by the said older methods of operation or treatment, I have since discovered that the separation may be made still more complete without lessening the quantity of material treated, and without decreasing the rapidity with which said material is treated. This I attain by imparting to the riffled plate a rising-and-falling motion, as well as a longitudinal reciprocating motion, whereby the black sand on the plate is more effectually kept alive, in that it is kept in constant motion, the riffled plate rising during its backward movement and falling during its forward movement, imparting an additional impulse to the material thereon that tends to more thoroughly scatter the same in the body of water, thereby facilitating the separation and subsidence of the particles of metal.

My invention therefore consists in imparting to the riffled plate a jigger motion, and simultaneously therewith a rising-and-falling or vertically-oscillating motion, in a body of confined water, as will now be fully described, reference being had to the accompanying drawing, in which I have shown by a vertical section an ore washer and separator or concentrator embodying my invention.

A indicates a suitable vessel adapted to contain a body of water. S S' S² are the screens, and R the riffle-plate below said screens, the upper screen S having the coarsest mesh and the lower screen S² the finest mesh. The screens and riffled plate are journaled near their rear and forward ends to two pairs of levers $l$ and $l'$, respectively, and receive a reciprocating motion from an eccentric E, connected by rod $r$ with one of the levers $l$.

Any suitable discharging device may be provided for the removal from vessel A of the tailings, and the screen and riffled-plate tailings, i. e., the gravel and black sand, may be removed together or separately. For instance, the screen-tailings may be discharged into a separate receiver within vessel A and discharged by a suitable conveyer C, while the black sand may be separately discharged by means of a suitable suction device, for instance, as described in Letters Patent above referred to, and as these devices do not form a part of this invention I have not deemed it necessary to illustrate the suction device or describe either discharge device in detail. The ore or placer-gravel is fed to the head of the upper screen S from a feed chute or trough T, and T' is the discharge chute or trough.

The rising-and-falling or vertically-oscillating motion is imparted to the riffled plate R by means of an eccentric E', connected with said plate by a link e', rotary motion being imparted to the shaft s of said eccentric in any suitable manner, said shaft having its bearings in the vertical walls of vessel A, suitable stuffing-boxes being provided to prevent escape of water. This reciprocating motion of the riffled plate in opposite directions has for its result to maintain the black sand in continuous motion, thereby facilitating the scattering thereof in the body of confined water and the separation of the particles of metal from the sand, which are caught by the riffles, behind which they collect, and are removed from time to time.

I do not desire to limit myself to the precise means described and shown whereby a vertical reciprocation is imparted to the riffle, as other means whereby this result can be attained may be used.

Having thus described my invention, what I claim as new therein, and desire to secure by Letters Patent, is—

In a machine for working placer-gravel, a vessel adapted to contain a body of water, a plurality of superposed screens, and a riffled plate below the same arranged for immersion in such body of water, rock bars or levers to which the screens are pivotally connected at both ends, and a pivotal connection between the head of the riffled plate and the bars or levers l; in combination with mechanism for imparting a rocking motion to said bars or levers l, and mechanism at or near the free end of the riffled plate adapted to impart a vertical oscillating motion to said plate on its pivots independently of the screens, for the purpose set forth.

In testimony that I claim the foregoing as my invention I have signed my name in presence of two subscribing witnesses.

CHARLES F. PIKE.

Witnesses:
  A. P. FRITZ,
  THOS. S. RODGERS.